Figure 1:
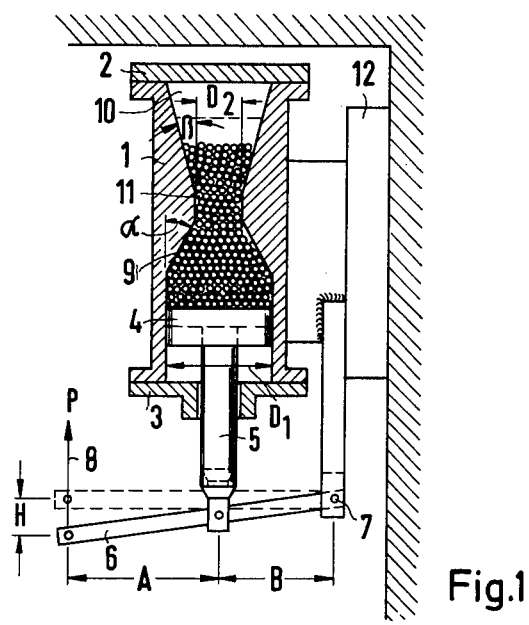

United States Patent [19]
Radermacher et al.

[11] 3,938,625

[45] Feb. 17, 1976

[54] VIBRATION DAMPING DEVICE, ESPECIALLY FOR PROTECTING PIPELINES FROM EARTHQUAKES

[75] Inventors: Gunter Radermacher, Rosrath; Karl Alexander Busch, Bensberg-Herkenrath, both of Germany

[73] Assignee: Interatom, Internationale Atomreaktorbau GmbH, Bensberg, Cologne, Germany

[22] Filed: Mar. 14, 1974

[21] Appl. No.: 451,187

[30] Foreign Application Priority Data

Mar. 19, 1973 Germany............................ 2313483

[52] U.S. Cl. ................................ 188/1 B; 188/268
[51] Int. Cl.²............................................ F16F 9/30
[58] Field of Search............ 188/1 B, 1 C, 268, 297, 188/311, 322

[56] References Cited

UNITED STATES PATENTS

| | | | |
|---|---|---|---|
| 2,732,040 | 1/1956 | De Vost et al.................. | 188/1 C X |
| 3,417,660 | 12/1968 | Harbrecht....................... | 188/268 X |
| 3,424,448 | 1/1969 | Chak Ma........................ | 188/268 X |
| 3,638,767 | 2/1972 | Elsner et al......................... | 188/268 |

Primary Examiner—Duane A. Reger
Attorney, Agent, or Firm—Herbert L. Lerner

[57] ABSTRACT

Device for damping abrupt movements of equipment such as pipelines wherein vibrations caused by earthquakes or ship movements or the like are excited, while movements resulting from thermal expansion of parts of the equipment are not hindered, includes a cylinder, a piston displaceable in the cylinder, and displaceable damping medium including a multiplicity of rollable bodies received in the cylinder.

7 Claims, 2 Drawing Figures

U.S. Patent    Feb 17, 1976    3,938,625

VIBRATION DAMPING DEVICE, ESPECIALLY FOR PROTECTING PIPELINES FROM EARTHQUAKES

The invention relates to a device for damping abrupt movements of pipelines caused by earthquakes or ship movements, while slow movements such as caused by thermal expansion of the components of the pipelines are unhindered, which includes a piston in a cylinder that is filled with a displaceable damping medium. In equipment and parts of equipment, such as pipelines, for example, which are subjected to very great deviations of temperature, there is an effort to manage with as small a number of fixed connecting parts as possible in order to permit an unhindered thermal expansion. A consequence thereof is that these pipelines have very low natural frequencies and that when accelerations are applied from the outside, considerable vibrations and, thereby, overstresses of the equipment parts occur. These accelerations can be produced, in the case of stationary equipment, by earthquakes and in the case of equipment located on board ships, by motion of the sea.

In order to protect pipeline systems especially against such abruptly occurring accelerations, an hydraulic impact-damping device has been proposed in German Published Non-Prosecuted Application DOS 1 650086. Such a heretofore known device, which operates with a piston displaceable in a cylinder, has the disadvantage, however, that the passage of the piston rod through the conventional stuffing box at the end of the cylinder can readily become leaky. If it is desired to protect parts of a nuclear reactor installation against earthquakes, other difficulties occur which completely preclude the use of hydraulic damping, such as, for example, the lack of durability or resistance of the appropriate hydraulic liquids to radiation, and the difficulty due to radiation loading of servicing or maintaining such an hydraulic damping device in the necessary confines.

The use of visco-elastic material such as has been suggested heretofore in German Published Non-Prosecuted Application DOS 1 937 619 for the purpose of the invention of the instant application is precluded because of the lack of or deficiency in the thermal or temperature resistance of such material. Purely mechanically-operating devices such as are taught, for example, in German Published Non-Prosecuted Application 1 959 878 suffer from the delicate nature and friction of such mechanisms. Moreover, it has also been known heretofore to detune the natural frequency of equipment parts that are to be protected, by applying additional masses thereto so that these additional masses are no longer excited by vibrations that are greater than about 0.5 Hz, and thus virtually form additional fixed or stationary points. This necessitates increased expense, however, which cannot always be realized in consideration of the space and weight relationships.

It is accordingly an object of the invention to provide a vibration damping device which avoids the foregoing disadvantages of heretofore known devices of this general type.

More specifically, it is an object of the invention to provide a vibration damping device, especially for pipelines, such as are employed in nuclear reactor installations, for example, which protects the pipelines from abrupt, impact-produced accelerations caused especially by earthquakes or movements of a ship on which the pipeline or installation may be mounted, while simultaneously assuring unhindered thermal expansion of the pipeline or installation parts. Moreover, it is an object of the invention to provide such a vibration damping device that is of the simplest possible construction and is as independent of temperature and free of maintenance or servicing requirements as possible.

With the foregoing and other objects in view, there is provided in accordance with the invention, a device for damping abrupt movements of equipment such as pipelines wherein vibrations caused by earthquakes or ship movements or the like are excited while movements resulting from thermal expansion of parts of the equipment are unhindered, comprising a cylinder, a piston displaceable in the cylinder, and displaceable damping medium comprising a multiplicity of rollable bodies received in the cylinder. Such bodies which are prone to rolling, for example, balls, contained in a cylinder having a piston which is displaceable therein and which is connected to the equipment part that is to be protected, have the advantage that they readily follow slow movements of the piston such as are produced, for example, by thermal expansion, yet produce a considerable resistance, however, to sudden abrupt displacements of the piston so that the displacements are rapidly brought to a halt. Demands with respect to leak-proofing of the piston with respect to the cylinder and of the piston rod with respect to the cylinder stuffing box are greatly reduced in comparison to the demands made upon hydraulic vibration dampers.

In order to increase the resistance to abrupt displacements of the piston, the cylinder is provided, along the length thereof and beyond the path of travel of the piston, with a portion of reduced cross section.

In accordance with yet another feature of the invention, the reduction in cross section of the cylinder is not effected stepwise but rather is gradual so that the inner shape of the cylinder substantially corresponds to that of an hour-glass more specifically, the portion of reduced cross section has a varying cross section smoothly reducing from a given cross section to a minimum cross section and then smoothly increasing back to the given cross section.

Though suitably dimensioning the piston stroke, the diameter of the rollable bodies, the constriction of the cylinder, and the angle of the constriction with respect to the longitudinal axis of the cylinder, the damping of the piston can be accommodated or matched to any speed of the piston and thereby to any vibration frequency of the equipment part to be protected.

In accordance with a further feature of the invention, the rollable bodies comprise a material having self-lubricating properties, so that the friction and thereby the wear of the rollable bodies with respect to each other and with respect to the piston and the cylinder are reduced to a minimum.

More specifically in accordance with the last-mentioned feature, the material having self-lubricating properties is graphite. Alternatively, the self-lubricating material is molybdenum disulfide. Both materials are distinguished by the fact that they have an ability to withstand high temperature and radiation so that they are especially suited for application in nuclear reactor installations.

In accordance with a concommitant feature of the invention, there is provided an assembly of a plurality of the foregoing vibration damping devices with equipment, the abrupt movement of which is to be damped, wherein the pistons of the devices are connected to the equipment at such locations thereof that parts of the equipment, at the occurrence of an effective damping of a vibration excited in the equipment, exhibit respective natural frequencies which are essentially above the frequency of the excited vibration. A number of vibration systems with very high natural frequencies are thereby obtained, wherein the equipment parts that are to be protected are subjected to lower stresses.

Although the invention is illustrated and described herein as vibration damping device, especially for protecting pipelines from earthquakes, it is nevertheless not intended to be limited to the details shown since various modifications and structural changes may be made therein without departing from the spirit of the invention and within the scope and range of equivalents of the claims.

Figure 2:
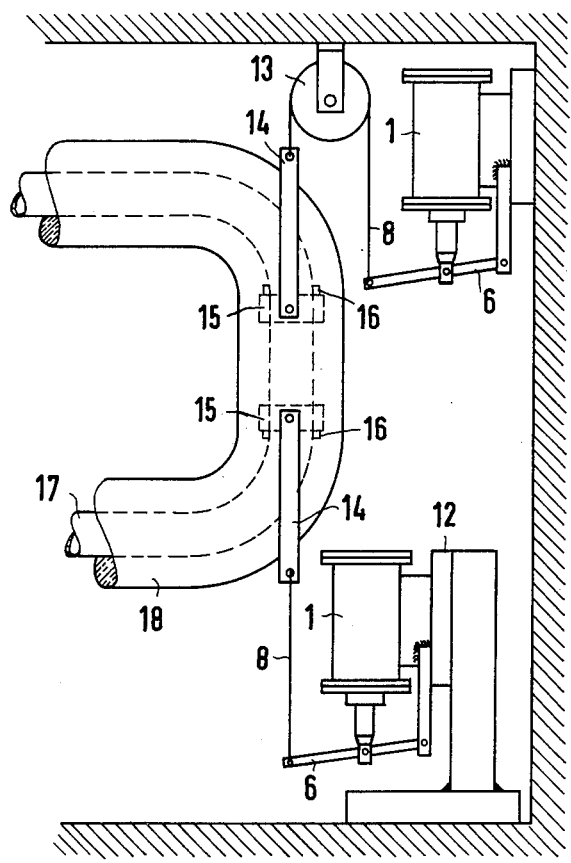

The construction and method of operation of the invention, however, together with additional objects and advantages thereof will be best understood from the following description of specific embodiments when read in connection with the accompanying drawing, in which:

FIG. 1 is a diagrammatic longitudinal sectional view of the vibration damping device of the invention; and FIG. 2 is a diagrammatic elevational view of an assembly of the damping device of FIG. 1 with a pipeline for protecting the latter against earthquakes, for example.

Referring now to the drawing, and first, particularly, to FIG. 1 thereof. There is shown a vibration damping device according to the invention which is formed of a cylinder 1 that is closed at the top and bottom thereof by respective covers 2 and 3. The cover 3 is provided with a central opening through which there extends a piston rod 5 that is connected at one end thereof to a piston 4 which is displaceable in the cylinder 1. The other end of the piston rod 5 is connected to a lever 6, for example by means of a conventional pin-and-slot connection. The lever 6 is pivotable at one end thereof about a fixed pivot 7, and has a connecting member 8, such as a cable, secured to the other end thereof by means of which the damping device of the invention is connectible to part of a piece of equipment or installation that is to be protected against excessive vibration by the vibration damping device of the invention. The cylinder 1 is divided by a constriction formed therein into a lower chamber and an upper chamber 10, as viewed in FIG. 1, and is partly filled with spherical bodies 11. With the aid of a bracket 12, the vibration-damping device of the invention is securable to a wall or the like.

The force applied to the spherical bodies or damping members 11 through the piston 4 and its arm 3 can be calculated in a conventional manner from knowledge of the force P acting through the connecting or transmission member 8 and the given deflection H of the lever 6, taking into consideration the length of the lever arms A and B. Through suitable proportioning of the piston diameter $D_1$ and the constriction diameter $D_2$ of the cylinder 1, as well as of the angles $\alpha$ and $\beta$, which are respectively, the angle defined by the declining wall of the lower chamber 9 with the vertical and the angle defined by the inclined wall of the upper chamber 10 with the vertical, there is assured for damping bodies 11 of suitable diameter that they will follow slow movements of the piston 4, such as when there is a slow upward movement of the piston 4, the damping bodies 11 will give way and rise out of the lower chamber 9 into the upper chamber 10 up to the horizontal broken line, for example, shown therein in FIG. 1. However, if an abrupt movement of the piston 4 is effected, the damping bodies 11 serve to prevent further movement of the piston 4. Since the angles $\alpha$ and $\beta$ are especially chosen so that the damping bodies 11 reliably slide off the wall of the cylinder 1, assurance is provided that the damping bodies will roll back into the lower chamber 9 from the upper chamber 10 when the piston 4 moves downwardly.

In FIG. 2, there is shown how vibration damping devices constructed in accordance with the invention as shown in FIG. 1, are connected by tie or tension members 8, such as cables, for example, either directly or through reversing rollers 13 to suitable mounting or fastening members 14, which are rod-like or strip-like members pivotally connected at one end thereof to respective clamps or clips 15 that are mounted on a pipeline 17, and prevented from axially sliding thereon by locking cams 16. The pipeline 17, that is provided, for example, with a jacket or casing 18 as a protection against heat or radiation or both thereof, can expand unhindered in all directions, for example due to heat, while being simultaneously securely held. If the pipeline 17 should be set into vibration for example, by an earthquake, the clamps or clips 15 form fixed points as a result of the operation of the damping device of the invention so that the pipeline system is subdivided into individual vibrating systems with very high natural frequencies. Because of the provision of a pair of damping devices according to the invention, as shown in the assembly of FIG. 2, which act in opposite directions, a virtually immediate suppression of the vibrations is assured.

It is within the scope of the invention of this application, from what is known in the case of hydraulic vibration dampers, to fill the cylinder on both sides of the piston with the proposed damping means, and the spaces on both sides of the piston are connected one with the other. With such a construction, impacts in both directions are damped, and the direction in which the piston rod extends can be selected as desired and a single damping device is often enough for effectively damping the vibrations.

We claim:

1. Device for damping abrupt movements of equipment such as pipelines wherein vibrations caused by earthquakes or ship movements or the like are excited, while movements resulting from thermal expansion of parts of the equipment are not hindered, comprising a cylinder having a substantially vertical longitudinal axis, said cylinder comprising a lower cylindrical chamber and an upper chamber having an upwardly reducing cross section communicating with said lower cylindrical chamber, a piston displaceable in said lower cylindrical chamber, displaceable damping medium comprising a multiplicity of small, solid rollable bodies received in said cylinder above said piston, and means located below said lower cylindrical chamber for connecting said piston to the equipment, the abrupt movements of which are to be damped, said piston being displaceable upwardly in said lower cylindrical chamber against gravity force exerted by said rollable bodies, upon transmission of an abrupt movement from the equipment through said connecting means to said piston.

2. Device according to claim 1 wherein said upper chamber has a substantially conical shape.

3. Device according to claim 1 including a supply chamber for said rollable bodies located above and communicating with said upper chamber of said cylinder, said supply chamber being substantially funnel-shaped.

4. Device according to claim 1 wherein said rollable bodies comprise a material having self-lubricating properties.

5. Device according to claim 4 wherein said material is graphite.

6. Device according to claim 4 wherein said material is molybdenum disulfide.

7. Assembly of a plurality of the devices of claim 1 with equipment, the abrupt movement of which is to be damped, wherein the pistons of the devices are connected to the equipment at such locations thereof that parts of the equipment, at the occurrence of an effective damping of a vibration excited in the equipment, exhibit respective natural frequencies which are essentially above the frequency of the excited vibration.

* * * * *